(12) United States Patent
Gibeau et al.

(10) Patent No.: US 11,498,446 B2
(45) Date of Patent: Nov. 15, 2022

(54) PLUG-IN CHARGE CURRENT MANAGEMENT FOR BATTERY MODEL-BASED ONLINE LEARNING

(71) Applicant: Ford Global Technologies, LLC, Dearborn, MI (US)

(72) Inventors: John Paul Gibeau, Canton, MI (US); Xu Wang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 16/735,330

(22) Filed: Jan. 6, 2020

(65) Prior Publication Data
US 2021/0206291 A1 Jul. 8, 2021

(51) Int. Cl.
*H02J 7/00* (2006.01)
*B60L 53/66* (2019.01)
*B60L 53/62* (2019.01)

(52) U.S. Cl.
CPC .............. *B60L 53/66* (2019.02); *B60L 53/62* (2019.02); *H02J 7/00036* (2020.01); *H02J 7/00714* (2020.01)

(58) Field of Classification Search
CPC ............. H02J 7/00036; H02J 7/00714; H02J 2310/48; B60L 53/66; B60L 53/62
USPC ................................................ 320/134, 109
See application file for complete search history.

(56) References Cited

U.S. PATENT DOCUMENTS

| | | | | |
|---|---|---|---|---|
| 4,069,449 A * | 1/1978 | Farnsworth | ......... | H02M 3/3155 363/28 |
| 5,149,413 A * | 9/1992 | Maget | .................... | F03G 7/005 204/258 |
| 5,193,067 A * | 3/1993 | Sato | ................... | G01R 31/3842 702/63 |
| 5,537,021 A * | 7/1996 | Weinberg | ......... | H03K 17/04123 320/166 |
| 5,631,542 A * | 5/1997 | Lohr | ...................... | H02J 7/022 320/143 |
| 6,061,638 A * | 5/2000 | Joyce | ................. | G01R 31/3648 702/63 |
| 6,075,350 A * | 6/2000 | Peng | .................... | H02J 3/1857 323/207 |
| 6,130,522 A * | 10/2000 | Makar | .................. | H01M 10/44 320/141 |
| 6,137,280 A * | 10/2000 | Ackermann | ........ | H02J 7/00047 323/354 |

(Continued)

FOREIGN PATENT DOCUMENTS

CN 105425153 A * 3/2016
CN 105977561 A * 9/2016
(Continued)

*Primary Examiner* — John T Trischler
(74) *Attorney, Agent, or Firm* — David B. Kelley; Brooks Kushman P.C.

(57) ABSTRACT

A vehicle includes a battery that is rechargeable using an external power source coupled to the vehicle. The vehicle includes a controller that is programmed to estimate parameters of the battery using a parameter estimation algorithm. The controller is programmed to change a charging current when connected to the external power source to provide an input to the parameter estimation algorithm that is sufficiently dynamic such that the parameter estimation algorithm converges to an accurate solution.

18 Claims, 4 Drawing Sheets

(56) References Cited

U.S. PATENT DOCUMENTS

| | | | | |
|---|---|---|---|---|
| 6,232,746 B1* | | 5/2001 | Yamanashi | G01R 31/389 320/132 |
| 6,653,817 B2* | | 11/2003 | Tate, Jr. | G01R 31/389 320/132 |
| 6,838,883 B2* | | 1/2005 | Kanou | G01R 31/379 324/439 |
| 7,009,402 B2* | | 3/2006 | Yumoto | G01R 31/36 324/433 |
| 7,164,272 B1* | | 1/2007 | Borrego Bel | B60R 16/04 324/429 |
| 7,626,394 B2* | | 12/2009 | Kimura | G01R 31/389 324/427 |
| 8,035,396 B2* | | 10/2011 | Kim | G01R 31/385 324/430 |
| 8,129,996 B2* | | 3/2012 | Iwane | G01R 31/3842 324/427 |
| 8,137,846 B2* | | 3/2012 | Nakashima | H01M 50/446 429/247 |
| 8,749,204 B2* | | 6/2014 | Majima | H01M 10/48 320/149 |
| 8,760,003 B2* | | 6/2014 | Imura | B60L 3/0015 307/9.1 |
| 8,935,043 B2* | | 1/2015 | Li | B60L 3/12 701/34.4 |
| 9,018,913 B2* | | 4/2015 | Middleton | G01R 31/3842 320/134 |
| 9,091,739 B2* | | 7/2015 | Iwane | G01R 31/3842 |
| 9,097,773 B2* | | 8/2015 | Joe | H01M 10/486 |
| 9,132,745 B1* | | 9/2015 | Lee | B60L 15/2009 |
| 9,153,988 B2* | | 10/2015 | Iwane | H02J 7/045 |
| 9,197,078 B2* | | 11/2015 | Lee | B60L 58/16 |
| 9,272,634 B2* | | 3/2016 | Li | B60L 3/12 |
| 9,287,729 B2* | | 3/2016 | Nyu | H02J 7/0027 |
| 9,304,173 B2* | | 4/2016 | Fink | G01R 31/389 |
| 9,312,722 B2* | | 4/2016 | Lee | H02J 7/342 |
| 9,354,277 B2* | | 5/2016 | Lin | G01R 31/3842 |
| 9,368,841 B2* | | 6/2016 | Wang | H01M 10/48 |
| 9,377,512 B2* | | 6/2016 | Frost | B60L 50/66 |
| 9,381,825 B2* | | 7/2016 | Li | G01R 31/367 |
| 9,440,552 B2* | | 9/2016 | Li | G01R 31/3842 |
| 9,457,686 B2* | | 10/2016 | Chang | H02J 7/14 |
| 9,465,077 B2* | | 10/2016 | Love | G01R 31/382 |
| 9,535,131 B2* | | 1/2017 | Kawano | G01R 31/385 |
| 9,539,912 B2* | | 1/2017 | Li | G01R 31/367 |
| 9,555,718 B2* | | 1/2017 | Li | B60L 58/21 |
| 9,632,125 B2* | | 4/2017 | Wang | B60L 3/12 |
| 9,676,288 B2* | | 6/2017 | Chang | B60L 58/12 |
| 9,716,294 B2* | | 7/2017 | Li | H02J 7/00047 |
| 9,718,455 B2* | | 8/2017 | Yu | B60W 10/06 |
| 9,793,735 B2* | | 10/2017 | Choi | H02J 7/022 |
| 9,843,069 B2* | | 12/2017 | Marcicki | H01M 10/4257 |
| 9,871,437 B2* | | 1/2018 | Hur | H02M 7/483 |
| 9,925,888 B2* | | 3/2018 | Chang | H02J 7/0026 |
| 10,023,064 B2* | | 7/2018 | Lee | B60L 53/665 |
| 10,040,366 B2* | | 8/2018 | Lee | H02J 7/0021 |
| 10,124,696 B2* | | 11/2018 | Li | H01M 10/486 |
| 10,124,789 B2* | | 11/2018 | Chang | B60L 3/0038 |
| 10,298,026 B2* | | 5/2019 | Trimboli | H02J 7/005 |
| 10,320,225 B2* | | 6/2019 | Tian | H02M 3/33592 |
| 10,353,007 B2* | | 7/2019 | Wada | G01R 31/382 |
| 10,446,885 B2* | | 10/2019 | Clarke | H01M 10/48 |
| 10,481,214 B2* | | 11/2019 | Marsili | G01R 31/389 |
| 10,491,030 B2* | | 11/2019 | Tian | H02J 7/00711 |
| 10,534,038 B2* | | 1/2020 | Tanaka | G01R 31/3842 |
| 10,536,006 B2* | | 1/2020 | Zhang | H01M 10/441 |
| 10,541,541 B2* | | 1/2020 | Zhang | H02J 7/0071 |
| 10,553,896 B2* | | 2/2020 | Marcicki | H01M 10/0525 |
| 10,569,660 B2* | | 2/2020 | Lee | B60L 58/24 |
| 10,664,562 B2* | | 5/2020 | Balasingam | G01R 31/367 |
| 10,703,219 B2* | | 7/2020 | Li | B60L 53/60 |
| 10,727,679 B2* | | 7/2020 | Zhang | H02J 7/0024 |
| 10,804,574 B2* | | 10/2020 | Clarke | H02J 7/0003 |
| 10,826,303 B2* | | 11/2020 | Zhang | H02J 7/00714 |
| 10,847,988 B2* | | 11/2020 | Shimura | H02J 7/007194 |
| 10,884,475 B1* | | 1/2021 | Wang | G01R 31/367 |
| 10,910,866 B2* | | 2/2021 | Zhang | H02J 7/022 |
| 10,916,951 B2* | | 2/2021 | Zhang | H02J 7/00714 |
| 10,933,768 B2* | | 3/2021 | Zhang | B60L 58/12 |
| 10,944,283 B2* | | 3/2021 | Tseng | H02M 1/4258 |
| 10,976,373 B2* | | 4/2021 | Ohkanda | H01M 10/44 |
| 11,056,896 B2* | | 7/2021 | Zhang | H02J 7/0047 |
| 11,072,258 B2* | | 7/2021 | Kumar | G07C 5/0808 |
| 11,125,826 B2* | | 9/2021 | Liu | H02J 7/00712 |
| 11,208,004 B2* | | 12/2021 | Jin | B60L 58/16 |
| 11,307,261 B2* | | 4/2022 | Takegami | H01M 10/48 |
| 2001/0028238 A1* | | 10/2001 | Nakamura | G01R 31/389 320/132 |
| 2002/0196027 A1* | | 12/2002 | Tate, Jr. | G01R 31/389 324/430 |
| 2003/0162088 A1* | | 8/2003 | Nakanishi | H01M 50/116 429/128 |
| 2004/0085072 A1* | | 5/2004 | Kanou | G01R 31/389 324/426 |
| 2004/0128088 A1* | | 7/2004 | Laletin | H01M 6/5083 702/64 |
| 2004/0169495 A1* | | 9/2004 | Yumoto | G01R 31/36 320/132 |
| 2006/0000460 A1* | | 1/2006 | Masters | F02P 5/1502 123/609 |
| 2006/0152224 A1* | | 7/2006 | Kim | G01R 31/392 324/430 |
| 2007/0048607 A1* | | 3/2007 | Nakashima | H01M 10/0525 429/209 |
| 2007/0299620 A1* | | 12/2007 | Yun | G01R 31/3842 702/63 |
| 2008/0303528 A1* | | 12/2008 | Kim | G01R 31/385 324/430 |
| 2010/0045298 A1* | | 2/2010 | Iwane | G01R 31/389 324/427 |
| 2010/0068628 A1* | | 3/2010 | Ueda | H01M 10/0569 429/304 |
| 2011/0008661 A1* | | 1/2011 | Kozuki | H01M 50/531 429/94 |
| 2011/0161025 A1* | | 6/2011 | Tomura | G16Z 99/00 702/63 |
| 2011/0187329 A1* | | 8/2011 | Majima | G01R 31/52 320/149 |
| 2011/0311860 A1* | | 12/2011 | Yamada | H01M 10/0525 429/163 |
| 2012/0026771 A1* | | 2/2012 | Imura | B60L 3/0015 363/178 |
| 2012/0105013 A1* | | 5/2012 | Lin | G01R 31/3842 320/162 |
| 2012/0135317 A1* | | 5/2012 | Nakashima | H01M 50/446 429/338 |
| 2012/0141885 A1* | | 6/2012 | Nakashima | H01M 10/0525 429/338 |
| 2012/0141886 A1* | | 6/2012 | Nakashima | H01M 50/446 429/338 |
| 2012/0141887 A1* | | 6/2012 | Nakashima | H01M 10/0525 429/338 |
| 2012/0200266 A1* | | 8/2012 | Berkowitz | G01R 31/388 320/139 |
| 2012/0310567 A1* | | 12/2012 | Fink | B60L 15/20 702/63 |
| 2012/0316815 A1* | | 12/2012 | Morigaki | G01R 31/392 702/63 |
| 2012/0328944 A1* | | 12/2012 | Tsukagoshi | H01G 11/48 429/213 |
| 2013/0047721 A1* | | 2/2013 | Nagai | H01M 4/13 73/32 R |
| 2013/0093384 A1* | | 4/2013 | Nyu | H02J 7/00 320/107 |
| 2013/0141109 A1* | | 6/2013 | Love | G01R 31/382 324/430 |
| 2013/0154577 A1* | | 6/2013 | Iwane | H02J 7/00714 320/162 |
| 2013/0179061 A1* | | 7/2013 | Gadh | B60L 55/00 701/123 |

(56) References Cited

U.S. PATENT DOCUMENTS

| | | | |
|---|---|---|---|
| 2013/0278223 A1* | 10/2013 | Li | H02J 7/00047 320/136 |
| 2013/0307334 A1* | 11/2013 | Middleton | G01R 31/3842 307/31 |
| 2014/0180614 A1* | 6/2014 | Chaturvedi | G01R 31/367 702/63 |
| 2014/0191764 A1* | 7/2014 | Kawano | G01R 31/389 324/430 |
| 2014/0214268 A1* | 7/2014 | Li | B60L 3/12 701/34.4 |
| 2014/0225567 A1* | 8/2014 | Stichowski | B60L 53/00 320/109 |
| 2014/0244193 A1* | 8/2014 | Balasingam | G01R 31/3835 702/63 |
| 2014/0244225 A1* | 8/2014 | Balasingam | G01R 31/3842 703/2 |
| 2014/0266059 A1* | 9/2014 | Li | B60L 15/2009 320/132 |
| 2014/0287287 A1* | 9/2014 | Osaka | H01M 10/613 429/92 |
| 2015/0064510 A1* | 3/2015 | Wang | H01M 10/63 429/50 |
| 2015/0066262 A1* | 3/2015 | Chang | B60L 58/21 701/22 |
| 2015/0066407 A1* | 3/2015 | Joe | G01R 31/3648 702/63 |
| 2015/0097512 A1* | 4/2015 | Li | B60L 58/13 320/101 |
| 2015/0153417 A1* | 6/2015 | Maluf | H01M 10/48 324/426 |
| 2015/0158395 A1* | 6/2015 | Li | B60W 10/26 701/22 |
| 2015/0163874 A1* | 6/2015 | Roberts | H05B 45/38 315/200 R |
| 2015/0171640 A1* | 6/2015 | Lee | B60L 58/14 320/109 |
| 2015/0231982 A1* | 8/2015 | Li | B60L 58/12 701/22 |
| 2015/0231985 A1* | 8/2015 | Li | B60L 58/13 320/134 |
| 2015/0231986 A1* | 8/2015 | Li | B60L 58/20 701/22 |
| 2015/0232083 A1* | 8/2015 | Yu | B60W 20/15 701/22 |
| 2015/0258907 A1* | 9/2015 | Lee | B60L 58/21 701/22 |
| 2015/0270072 A1* | 9/2015 | Sonobe | C01B 32/00 361/502 |
| 2015/0285867 A1* | 10/2015 | Wang | G01R 31/367 702/63 |
| 2015/0288197 A1* | 10/2015 | Choi | G01R 31/392 320/107 |
| 2015/0306971 A1* | 10/2015 | Chang | B60L 58/16 701/22 |
| 2015/0326038 A1* | 11/2015 | Lee | H02J 7/00302 320/134 |
| 2015/0352972 A1* | 12/2015 | Li | H01M 10/482 701/22 |
| 2016/0001672 A1* | 1/2016 | Lee | H02J 7/00712 320/136 |
| 2016/0006275 A1* | 1/2016 | Lee | G01R 31/005 320/112 |
| 2016/0013716 A1* | 1/2016 | Hur | H02M 1/32 363/50 |
| 2016/0020618 A1* | 1/2016 | Yang | H02J 7/02 320/162 |
| 2016/0025789 A1* | 1/2016 | Wang | B60L 3/00 324/503 |
| 2016/0059023 A1* | 3/2016 | Freeman | A61N 1/3987 607/8 |
| 2016/0093927 A1* | 3/2016 | Marcicki | H01M 10/482 429/50 |
| 2016/0272080 A1* | 9/2016 | Chang | H02J 7/0047 |
| 2016/0336765 A1* | 11/2016 | Trimboli | H02M 3/33507 |
| 2017/0096077 A1* | 4/2017 | Li | G01R 31/396 |
| 2017/0098021 A1* | 4/2017 | He | G06F 30/20 |
| 2017/0246963 A1* | 8/2017 | Lee | H01M 10/46 |
| 2017/0253140 A1* | 9/2017 | Chang | B60L 58/12 |
| 2017/0259684 A1* | 9/2017 | Lee | H02J 7/0047 |
| 2017/0259685 A1* | 9/2017 | Lee | H02J 7/0048 |
| 2017/0331162 A1* | 11/2017 | Clarke | H02J 7/005 |
| 2018/0026472 A1* | 1/2018 | Zhang | H02J 7/045 320/145 |
| 2018/0053965 A1* | 2/2018 | Marcicki | H01M 10/4257 |
| 2018/0069409 A1* | 3/2018 | Tian | H02J 7/0029 |
| 2018/0069418 A1* | 3/2018 | Tian | H02J 7/022 |
| 2018/0083477 A1* | 3/2018 | Tian | H01M 10/44 |
| 2018/0090977 A1* | 3/2018 | Zhang | H02M 7/04 |
| 2018/0102658 A1* | 4/2018 | Zhang | H02J 7/0063 |
| 2018/0123383 A1* | 5/2018 | Tian | H02J 7/022 |
| 2018/0145533 A1* | 5/2018 | Tian | H02M 1/44 |
| 2018/0183260 A1* | 6/2018 | Tian | H02M 7/217 |
| 2018/0183262 A1* | 6/2018 | Tian | H02M 3/335 |
| 2018/0217209 A1* | 8/2018 | Marsili | G01R 31/389 |
| 2018/0233772 A1* | 8/2018 | Sasaki | G01R 31/392 |
| 2018/0248385 A1* | 8/2018 | Zhang | H02M 3/33569 |
| 2018/0262042 A1* | 9/2018 | Tian | H01M 10/425 |
| 2018/0269697 A1* | 9/2018 | Zhang | H02J 7/00036 |
| 2018/0269700 A1* | 9/2018 | Tian | H02M 3/33507 |
| 2018/0294666 A1* | 10/2018 | Tian | H02J 7/007182 |
| 2018/0321326 A1* | 11/2018 | Tanaka | G01R 31/3833 |
| 2018/0331559 A1* | 11/2018 | Tian | H02J 7/00711 |
| 2018/0331560 A1* | 11/2018 | Tian | H02J 7/0071 |
| 2018/0331563 A1* | 11/2018 | Tian | H02J 7/027 |
| 2018/0342890 A1* | 11/2018 | Tian | H02M 7/06 |
| 2018/0351396 A1* | 12/2018 | Chen | H02J 7/04 |
| 2018/0358818 A1* | 12/2018 | Zhang | H01M 10/441 |
| 2018/0358835 A1* | 12/2018 | Tian | H02J 7/04 |
| 2018/0358836 A1* | 12/2018 | Tian | H01M 10/44 |
| 2019/0036373 A1* | 1/2019 | Shimura | G01R 31/389 |
| 2019/0097441 A1* | 3/2019 | Chen | H02J 7/0019 |
| 2019/0115769 A1* | 4/2019 | Chen | H02J 7/0068 |
| 2019/0170830 A1* | 6/2019 | Ohkanda | G01R 31/3842 |
| 2019/0176639 A1* | 6/2019 | Kumar | G07C 5/0808 |
| 2019/0199114 A1* | 6/2019 | Tseng | H02J 7/04 |
| 2019/0229538 A1* | 7/2019 | Zhang | H02J 7/045 |
| 2019/0248252 A1* | 8/2019 | Jin | B60L 58/15 |
| 2019/0252904 A1* | 8/2019 | Tian | H02J 7/02 |
| 2019/0312454 A1* | 10/2019 | Tian | H02J 7/007182 |
| 2019/0334369 A1* | 10/2019 | Tian | H02J 7/0031 |
| 2019/0366852 A1* | 12/2019 | Zhang | B60L 58/12 |
| 2019/0393716 A1* | 12/2019 | Tian | H02M 3/33592 |
| 2020/0044294 A1* | 2/2020 | Clarke | H02J 7/0021 |
| 2020/0106276 A1* | 4/2020 | Zhang | H02J 7/00302 |
| 2020/0363476 A1* | 11/2020 | Liu | G01R 31/389 |
| 2020/0408842 A1* | 12/2020 | Sada | G01R 31/389 |
| 2021/0013731 A1* | 1/2021 | Choe | G01R 31/367 |
| 2021/0028511 A1* | 1/2021 | Clarke | H01M 10/48 |
| 2021/0188106 A1* | 6/2021 | Asa | H02J 7/0047 |
| 2021/0188120 A1* | 6/2021 | Wang | B60L 58/13 |
| 2021/0237614 A1* | 8/2021 | Yao | B60L 58/12 |
| 2021/0296910 A1* | 9/2021 | Zhang | H02J 7/0013 |
| 2021/0304972 A1* | 9/2021 | Rastegar | G01K 13/00 |
| 2021/0307113 A1* | 9/2021 | Rastegar | H01G 11/08 |
| 2022/0063442 A1* | 3/2022 | Jin | B60L 50/60 |

FOREIGN PATENT DOCUMENTS

| | | | |
|---|---|---|---|
| CN | 107834630 A * | 3/2018 | |
| CN | 108241128 A * | 7/2018 | |
| CN | 112886665 A * | 6/2021 | |
| EP | 2869075 A1 * | 5/2015 | H02H 3/17 |
| JP | 03226688 A * | 10/1991 | |
| JP | 03249582 A * | 11/1991 | |
| JP | H06276744 A * | 9/1994 | |
| JP | 2015195682 A * | 11/2015 | |
| KR | 100454645 B1 * | 11/2004 | |
| KR | 20110072838 A * | 6/2011 | |
| KR | 20140052658 A * | 5/2014 | |
| KR | 20200064189 A * | 6/2020 | B60W 20/11 |

(56) References Cited

FOREIGN PATENT DOCUMENTS

| WO | WO-2005029096 A2 | * | 3/2005 | ............... H02M 1/12 |
| WO | WO-2012159298 A1 | * | 11/2012 | ......... H04W 72/1231 |
| WO | WO-2013124012 A2 | * | 8/2013 | ................ H02J 7/02 |

* cited by examiner

PLUG-IN CHARGE CURRENT MANAGEMENT FOR BATTERY MODEL-BASED ONLINE LEARNING

TECHNICAL FIELD

This application relates to a vehicle system for estimating traction battery parameters.

BACKGROUND

A hybrid-electric or all-electric vehicle has a traction battery to store and provide energy for vehicle propulsion. In order to improve performance and battery life, it is necessary to operate the battery within certain limits. Operating the battery outside of the limits may decrease the performance or life of the battery. An important quantity for controlling and operating the battery pack is the battery power capability. The battery power capability indicates how much power the battery is capable of providing (discharge) or receiving (charge) in order to meet driver and vehicle demands.

SUMMARY

A vehicle includes a battery. The vehicle includes a controller programmed to identify values of parameters of the battery via a parameter estimation algorithm and, responsive to an external power supply being coupled to the vehicle and providing a current to the battery in a presence of a request to identify the values of the parameters, change the current flowing to the battery from a normal charging current to a predetermined continuously varying charge current that causes a residual error of the parameter estimation algorithm to converge toward zero.

The predetermined continuously varying charge current may be a sinusoidal current that varies sinusoidally between a predetermined maximum current and a predetermined minimum current. The normal charging current may be a generally constant current. The controller may be further programmed to generate the request to identify the values responsive to an elapsed time since a last parameter estimation exceeding a predetermined duration. The controller may be further programmed to generate the request to identify the values responsive to a throughput of the battery since a last parameter estimation exceeding a predetermined throughput. The parameter estimation algorithm may be an extended Kalman filter. The controller may be further programmed to, responsive to the residual error falling below a predetermined threshold, change the current to the normal charging current for charging the battery. A frequency of the predetermined continuously varying charge current may be configured such that a rate of change of the current is prevented from exceeding a predetermined maximum rate of change.

A system for charging a battery of a vehicle includes a controller programmed to, responsive to an external power source providing power to the battery during a charge event and in a presence of a request to identify values of parameters of the battery using a parameter estimation algorithm, change a current flowing to the battery from a generally constant current to a predetermined continuously varying charge current that causes a residual error of the parameter estimation algorithm to converge toward zero. The controller may be further programmed to generate the request to identify the values responsive to an elapsed time since a last parameter estimation exceeding a predetermined duration. The controller may be further programmed to generate the request to identify the values responsive to a throughput of the battery since a last parameter estimation exceeding a predetermined throughput. The controller may be further programmed to, responsive to identifying the values with a predetermined accuracy, change the current back to the generally constant current for charging the battery. The predetermined continuously varying charge current may be a sinusoidal current that varies sinusoidally between a predetermined maximum current and a predetermined minimum current. The predetermined continuously varying charge current may be configured to limit a rate of change of the current to a predetermined maximum rate of change. The parameter estimation algorithm may be an extended Kalman filter.

A method includes, by a controller, identifying values of parameters of a battery of a vehicle using a parameter estimation algorithm responsive to a request to identify the values. The method further includes, by the controller, causing a current for charging a battery to be a generally constant current responsive to a charge event when an external power source is coupled to the vehicle. The method includes, by the controller, changing the current to be a predetermined continuously varying current that causes a residual error of the parameter estimation algorithm to converge toward zero responsive to receiving the request to identify parameters of the battery during the charge event.

The method may further include, responsive to the residual error falling below a threshold, causing the current to be to the generally constant current. The method may further include generating the request to identify the values responsive to a throughput of the battery since a last parameter estimation exceeding a predetermined throughput. The method may further include generating the request to identify the values responsive to an elapsed time since a last parameter identification exceeding a predetermined duration. The predetermined continuously varying current may be a sinusoidal current that varies sinusoidally between a predetermined maximum current and a predetermined minimum current.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A battery pack may be modeled by an equivalent circuit model (ECM) having an arrangement of impedance components. The ECM may depend on the type and chemistry of the battery being used. The battery power capability may be calculated based on the battery impedance component values of the model. The battery impedance component values may vary with age and temperature of the battery.

A recursive parameter estimation method, such as an Extended Kalman Filter (EKF) may be used to identify battery equivalent circuit model impedance parameters. A shortcoming of the EKF is that it may require some time to converge to the true parameter values. In addition, the EKF may require sufficiently dynamic inputs in order to guarantee convergence to the actual parameter values. In the absence of sufficiently dynamic inputs, the EKF may return inaccurate values. During periods in which the inputs are not sufficiently dynamic, alternative strategies may be defined for updating the parameters and corresponding battery power capability values.

Figure 1:
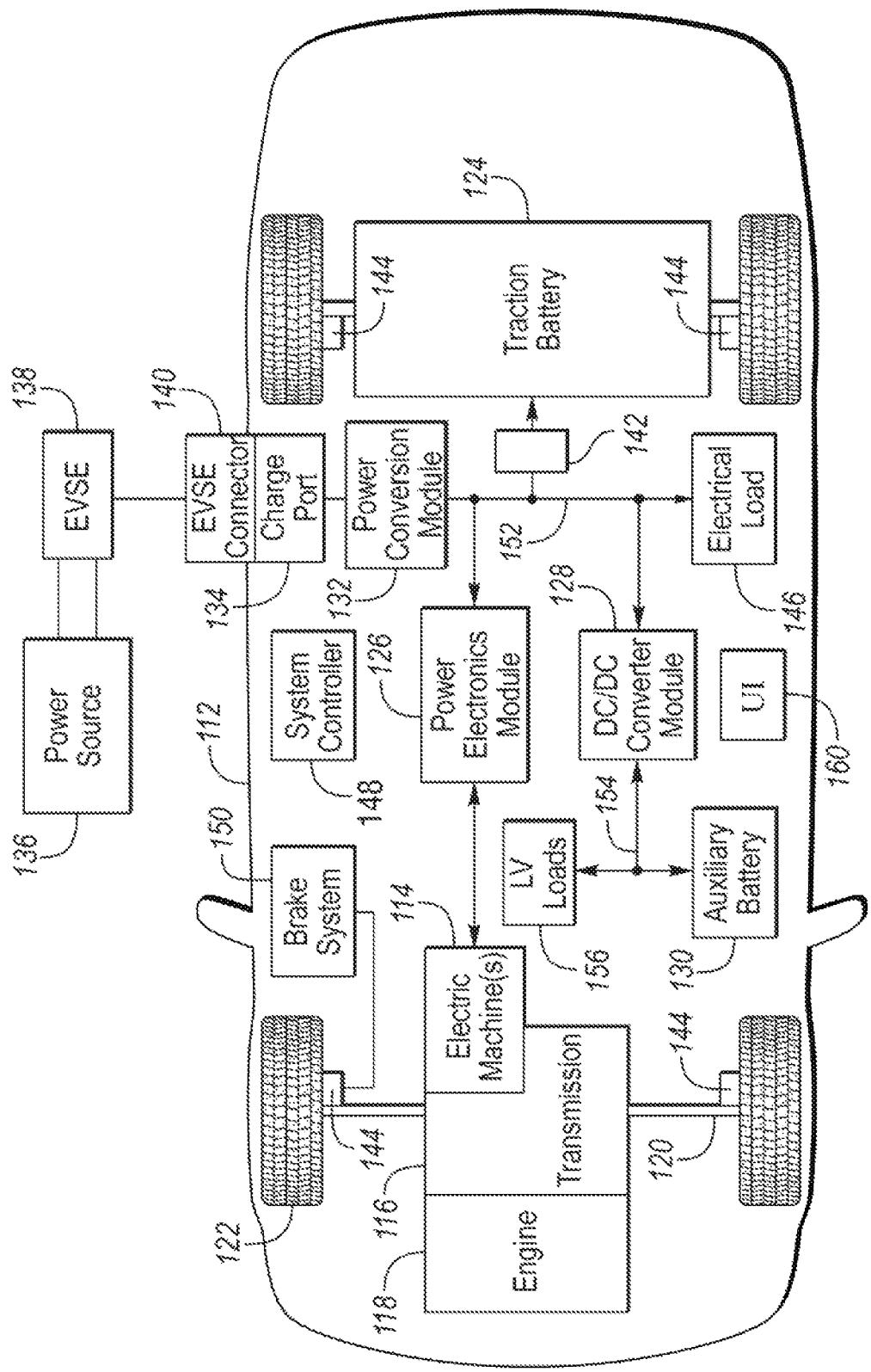
FIG. 1 is a diagram of a plug-in hybrid-electric vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

The electrified vehicle 112 may further include a user interface 160. The user interface 160 may provide a variety of display elements for communicating information to the operator. The user interface 160 may provide a variety of input elements for receiving information from the operator. The user interface 160 include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are indicative of charging being inhibited and vehicle operation being inhibited. The user interface 160 may also provide display elements for indicating a single contactor weld condition and a double contactor weld condition. The display elements may include discrete lamps and/or messages in a message display area.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

Figure 2:
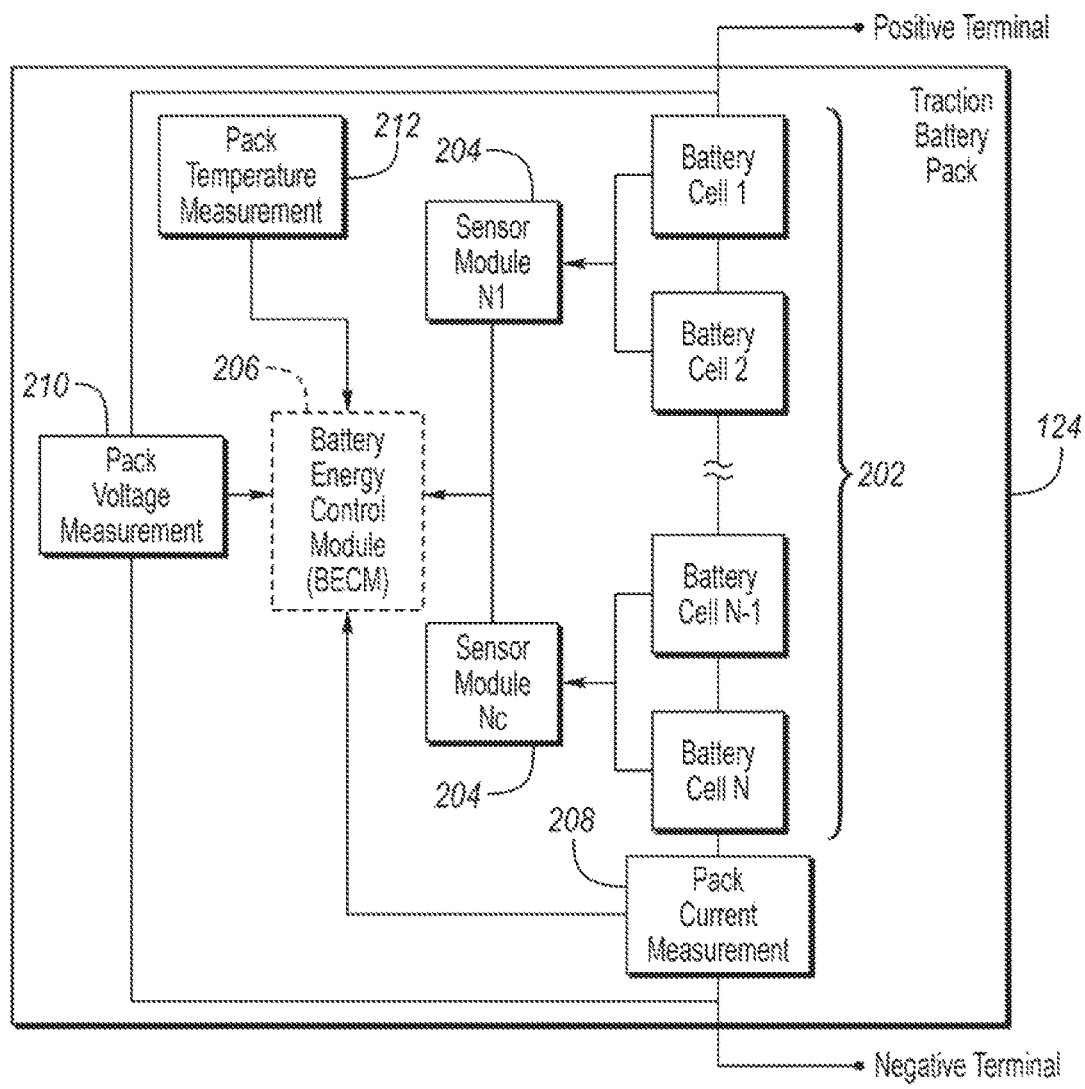
FIG. 2 is a diagram of a possible battery pack arrangement comprised of multiple cells, and monitored and controlled by a Battery Control Module.

The traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to N, sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the contactor module 142 for opening and closing the associated contactors.

Figure 3:
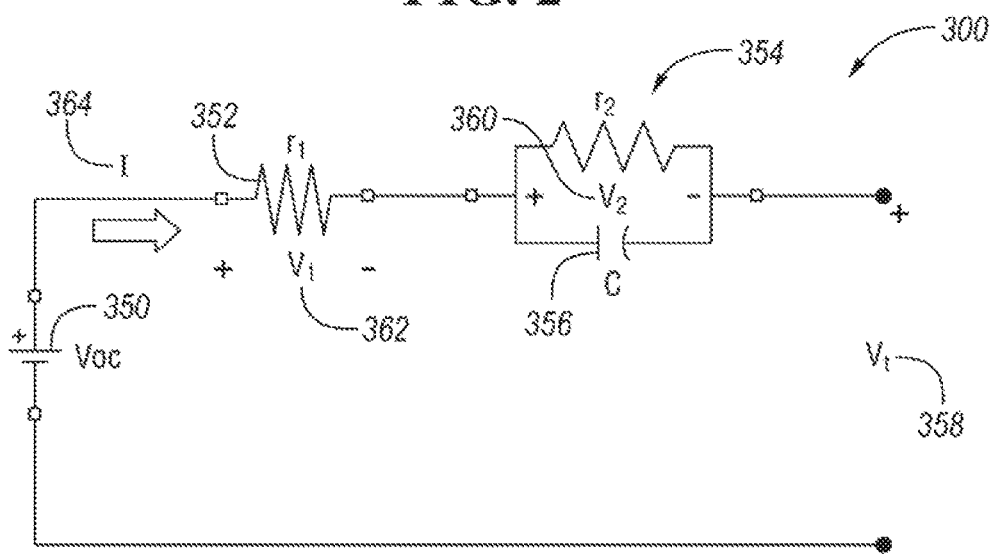
FIG. 3 is a diagram of an example battery cell equivalent circuit.

A Lithium-ion battery may be modeled in different ways. FIG. 3 shows one possible battery cell equivalent circuit model (ECM) 300. A battery cell can be modeled as a voltage source ($V_{oc}$) 350 having resistances (352 and 354) and capacitance 356 associated with it. Because of the battery cell impedance, the terminal voltage, $V_t$ 358, is typically not the same as the open-circuit voltage, $V_{oc}$ 350. The open-circuit voltage, $V_{oc}$ 350, is not readily measurable as only the terminal voltage 358 of the battery cell is accessible for measurement. Because the $V_{oc}$ 350 is not readily measurable, a model-based method may be used to estimate the value. A model may require that the values of resistance and capacitance be known or estimated. The battery cell model may depend on the battery chemistry. The precise model chosen for the battery cell is not necessarily critical to the methods described. The battery cell model may be extended to the entire traction battery 124 comprising battery cells 202 that are electrically coupled together. For example, the various model parameters may have values based on the series/parallel combinations of the various model elements.

Figure 4:
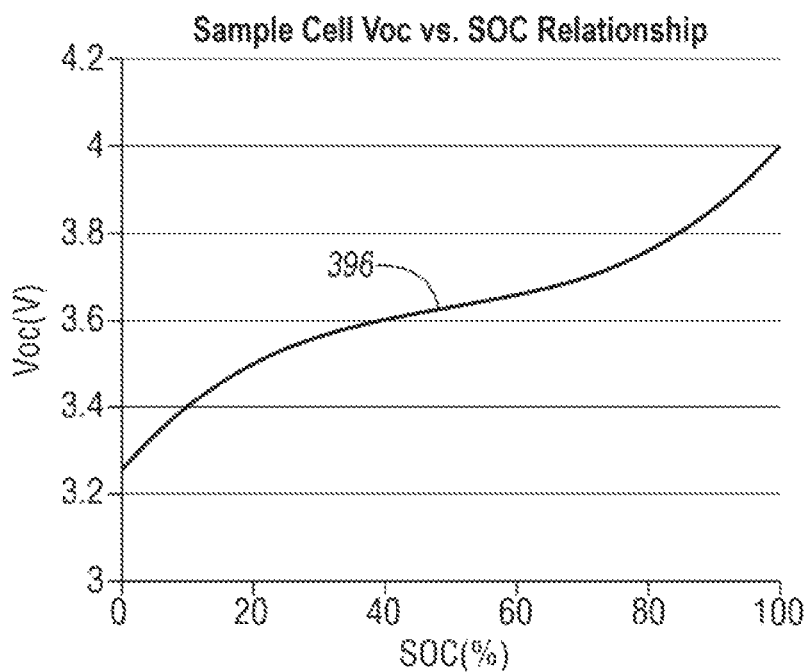
FIG. 4 is a graph that illustrates a possible open-circuit voltage (Voc) vs. battery state of charge (SOC) relationship for a typical battery cell.

For a typical Lithium-Ion battery cell, there is a relationship between SOC and the open-circuit voltage ($V_{oc}$) such that $V_{oc}$=f(SOC). FIG. 4 shows a typical curve 396 showing the open-circuit voltage $V_{oc}$ as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a table lookup or an equivalent equation. The exact shape of the curve 396 may vary based on the exact formulation of the Lithium-Ion battery. The voltage $V_{oc}$ changes as a result of charging and discharging of the battery. The characteristic may be used to estimate the open-circuit voltage value for the following algorithms.

The governing equations for the equivalent circuit model may be written as follows:

$$\dot{V}_2 = -\frac{1}{r_2 C} V_2 + \frac{1}{C} I \quad (1)$$

$$V_{oc} - V_t = V_2 + I r_1 \quad (2)$$

where: $V_2$ 360 is a voltage across the RC network (C 356/$r_2$ 354) of the circuit model;

$$\dot{V}_2 = \frac{dV_2}{dt}$$

is the time based derivative of $V_2$ 360; $r_2$ 354 is a charge transfer resistance of the battery; C 360 is a double layer capacitance of the battery; I 364 is the measured current flowing through the battery; $V_{oc}$ 350 is the open circuit voltage of the battery; $V_t$ 358 is the measured battery voltage across the battery terminals (terminal voltage); and $r_1$ 352 is an internal resistance of the battery.

In a typical battery system, some values, such as the current I 364 and the terminal voltage $V_t$ 358 may be measured directly by corresponding sensors. However, the resistance and capacitance values may vary over time and may not be readily measurable. A battery impedance parameter estimation model may be used to calculate the impedance parameters of the battery. One method of estimating the parameters of a system is to utilize a recursive parameter estimation method, such as an Extended Kalman Filter (EKF). For example, an EKF may be constructed that uses the current I 364 as an input, the voltage $V_2$ 360 as a state, and a voltage difference, $V_{oc}$-$V_t$, as an output. The battery ECM impedance parameters ($r_1$ 352, $r_2$ 354, and C 356) or combinations of the parameters may also be treated as states for identification. Once the parameters and states have been identified, a battery power capability may be calculated based on the operating limits of a battery voltage and current, and the current battery state.

The vehicle may include a controller programmed to identify the parameters of the battery using a parameter estimation algorithm. The parameters may include the ECM impedance and voltage parameters. The states of the estimation model may be chosen to allow one or more of the battery impedances and voltage states to be calculated either directly or indirectly. One such set of states for the battery model can be defined as follows:

$$x = \begin{bmatrix} x_1 \\ x_2 \\ x_3 \\ x_4 \end{bmatrix} = \begin{bmatrix} V_2 \\ \frac{1}{r_2 C} \\ \frac{1}{C} \\ r_1 \end{bmatrix} \quad (3)$$

The system output may be defined as:

$$y = V_{oc} - V_t \quad (4)$$

The system output may be estimated using the measured terminal voltage and the open-circuit voltage derived from the state of charge. Equations (1) and (2) may be written in terms of the defined states as follows:

$$\dot{x}_1 = -x_1 x_2 + x_3 I \quad (5)$$

$$y = x_1 + x_4 I \quad (6)$$

Based on the system model to be described below, an observer may be designed to estimate the extended states ($x_1$, $x_2$, $x_3$ and $x_4$). By estimating the states, the battery impedance parameters ($r_1$, $r_2$, and C) and the voltage parameter ($V_2$) may be estimated according to the following equations.

$$\hat{V}_2 = x_1 \quad (7)$$

$$\hat{r}_1 = x_4 \quad (8)$$

$$\hat{r}_2 = \frac{x_3}{x_2} \quad (9)$$

$$\hat{C} = \frac{1}{x_3} \quad (10)$$

An EKF is a dynamic system that may be governed by the following equations:

$$x(k) = f(x(k-1), i(i-1)) + w(k-1) \quad (11)$$

$$y(k) = h(x(k), i(k)) + v(k) \quad (12)$$

where $f(\ )$ is a system function, having k as a time index and $T_s$ is the sampling period, and defined as;

$$f(x(k), i(k)) = \begin{bmatrix} (1 - T_s x_2(k)) x_1(k) + T_s x_3(k) i(k) \\ x_2(k) \\ x_3(k) \\ x_4(k) \end{bmatrix} \quad (13)$$

$h(\ )$ is a measurement function defined as;

$$h(x(k), i(k)) = x_1(k) + x_4(k) i(k) \quad (14)$$

$x(k)$ is the system state x that is evaluated at a time $k*T_s$ as;

$$x(k) = \begin{bmatrix} x_1(k) \\ x_2(k) \\ x_3(k) \\ x_4(k) \end{bmatrix} \quad (15)$$

$i(k)$ is the input (e.g., battery current, I);

$w(k)$ is a zero mean white process noise with known covariance matrix $Q(k)$;

$y(k)$ is the system output ($V_{oc}$-$V_t$); and $v(k)$ is a zero mean white measurement noise with known covariance matrix, $R(k)$;

The discrete-time domain model defined by the equations is a nonlinear system. A state-transition model, $$F(k) = \frac{\partial f}{\partial x}\bigg|_{x(k), i(k)},$$

and an observation model, $$H(k) = \frac{\partial h}{\partial x}\bigg|_{x(k), i(k)},$$

may be defined. To linearize the equations, the Jacobians of the system function and the measurement function may be derived as:

$$F(k) = \frac{\partial f}{\partial x}\bigg|_{x(k),i(k)} = \begin{bmatrix} 1-T_s x_2(k) & -T_s x_1(k) & -T_s i(k) & 0 \\ 0 & 1 & 0 & 0 \\ 0 & 0 & 1 & 0 \\ 0 & 0 & 0 & 1 \end{bmatrix} \quad (16)$$

$$H(k) = \frac{\partial h}{\partial x}\bigg|_{x(k),i(k)} = [1 \quad 0 \quad 0 \quad i(k)] \quad (17)$$

The linearized difference equations of the ECM may be expressed as:

$$x(k)=F(k)\times(k-1)+w(k-1) \quad (18)$$

$$y(k)=H(k)\times(k)+v(k) \quad (19)$$

These equations represent the linearized ECM system and may be used in the EKF recursive processing. The complete set of EKF equations consists of time update equations and measurement update equations. A first variable, $\hat{x}(k|k)$, may represent an a posteriori state estimate of the states $x(k)$ at a time step k given measurements up to and including time k (e.g., y(k), y(k−1), ... ). A second variable, $\hat{x}(k|k-1)$, may represent an a priori state estimate (or prediction) of x(k) by using $\hat{x}(k-1|k-1)$, which does not include the information of measurement y(k) at time step k. P(k|k) may represent an a posterior estimation error covariance matrix for x(k) given measurements up to and including time k (e.g., y(k), y(k−1), ... ). P(k|k) may be a measure of the estimation accuracy of the state estimate. The equation P(k|k)=cov(x(k)−$\hat{x}$(k|k)) may define the error covariance matrix. P(k|k−1) may represent the state prediction error covariance matrix of x(k) given prior measurements (e.g., y(k−1), y(k−2), ... ).

The controller may be programmed to execute a parameter estimation model to estimate impedance and voltage parameters of the battery. The operations may be implemented in a controller such as the BECM 206. The recursive processing of the extended Kalman filter may be executed at predefined sampling intervals. The parameters and variables for the state estimation may be initialized to predetermined values. For example, $\hat{x}(k-1|k-1)$, P(k−1|k−1) and i(k−1), and the input i(k) may be initialized to predetermined values. States may be initialized to a last known state or may be initialized to default values. Parameters or variables associated with measured values may be initialized by sampling the corresponding sensor.

At the start of each iteration, new information may be generated by measuring or computing corresponding parameters. Previously known or generated values may be collected and/or computed. At each time step k, values of $\hat{x}(k-1|k-1)$, P(k−1|k−1) and i(k−1) may be known from prior iterations. At this time, new information may be measured. For example, y(k) may be derived from a voltage measurement and i(k) may be derived from a current measurement.

The system and measurement matrices may then be updated. The state transition matrix, F(k), may be updated using the previous state estimate, $\hat{x}(k-1|k-1)$, and the previous current measurement, i(k−1), in the above-described equations. The measurement matrix, H(k), may be updated using the present current measurement, i(k), in the above-described equations.

The states and the outputs may then be predicted or learned. The controller may be programmed to generate a prediction of the (a priori) state estimate as:

$$\hat{x}(k|k-1)=f(\hat{x}(k-1|k-1),i(k)) \quad (20)$$

The controller may then be programmed to generate a prediction of the (a priori) measurement estimate:

$$\hat{y}(k|k-1)=h(\hat{x}(k|k-1),i(k)) \quad (21)$$

A measurement residual may then be generated. The controller may be programmed to calculate the measurement residual (or innovation) as:

$$e(k)=y(k)-\hat{y}(k|k-1) \quad (22)$$

The state and measurement prediction covariances and the Kalman gain may then be computed. A Kalman gain, K(k), may be calculated by first predicting an (a priori) state estimate covariance as follows:

$$P(k|k-1)=F(k-1)P(k-1|k-1)F(k-1)'+Q(k-1) \quad (23)$$

A measurement residual (or innovation) covariance S(k)=cov(e(k)) may be generated as follows:

$$S(k)=H(k)P(k|k-1)H(k)'+R(k) \quad (24)$$

The Kalman gain may then be computed as:

$$K(k)=P(k|k-1)H(k)'S(k)^{-1} \quad (25)$$

The state estimation and the state estimation covariance may then be computed. The controller may be programmed to update the (a posteriori) state estimate as follows:

$$\hat{x}(k|k)=\hat{x}(k|k-1)+K(k)e(k) \quad (26)$$

where K(k) is the Kalman gain. The (a posteriori) state estimate covariance may be updated according to following equation:

$$P(k|k)=(I-K(k)H(k))P(k|k-1)(I-K(k)H(k))'+K(k)R(k)K(k)' \quad (27)$$

and may be equivalently be expressed as:

$$P(k|k)=(I-K(k)H(k))P(k|k-1) \quad (28)$$

The ECM parameters may be derived from the state estimates as follows:

$$\hat{V}_2(k) = \hat{x}_1(k|k) \quad (29)$$

$$\hat{r}_1(k) = \hat{x}_4(k|k) \text{ if } \hat{x}_4(k|k) > 0 \quad (30)$$

$$\hat{r}_2(k) = \frac{\hat{x}_3(k|k)}{\hat{x}_2(k|k)} \text{ if } \hat{x}_2(k|k) > 0 \text{ and } \hat{x}_3(k|k) > 0 \quad (31)$$

$$\hat{c}(k) = \frac{1}{\hat{x}_3(k|k)} \text{ if } \hat{x}_3(k|k) > 0 \quad (32)$$

When the ECM parameters are estimated, other derived values may be computed. For example, the battery power capability may be calculated based on the estimated ECM parameters as will be described herein. Several battery power capability parameters may be defined. An allowed minimum pack voltage, $v_{min}$, may be defined that may change with battery temperature. An allowed maximum pack voltage, $v_{max}$, may be defined that may change with battery temperature. The minimum pack voltage and the maximum pack voltage may be defined by the manufacturer based on the battery characteristics. A discharge current limit, $i_{dchlim}$, may be defined that changes with battery temperature and SOC. A charge current limit, $i_{chlim}$, may be defined that changes with battery temperature and SOC. The battery power capability parameters may be computed for different time intervals. A time duration, $t_d$, may be defined for the power capability estimates. The time duration may be indicative of the time over which the power capability is rated. For example, a one-second power capability estimation may be defined by setting the time duration to one second and a half-second power capability estimation may be defined by setting the time duration to a half second. The power capability may describe the amount of power that may be provided to or from the battery during the time duration.

The first order differential equations described above may be solved using the estimated battery ECM parameters in the equations to yield the following expression for the battery current (I).

$$I = \frac{(V_{oc} - V_t - \hat{V}_2(0)e^{-t_d/(\hat{r}_2 * \hat{C})})}{[\hat{r}_1 + \hat{r}_2(1 - e^{-t_d/(\hat{r}_2 * \hat{C})})]} \quad (33)$$

where: $t_d$ is the predetermined time duration; $\hat{V}_2(0)$ is the present value of $V_2$, and e is the base of the natural logarithm.

In general, once the value for the current (I) is determined, the battery power capability can be estimated. Where it is desired to determine a charge power capability for the battery, the current equation can be solved for a minimum value of current (I), such as described in the following equation. By convention, current is defined as a positive (+) quantity when flowing away from a battery (discharge), and as a negative (−) quantity when flowing into the battery (charge).

$$I(t_d, v_{max}) = \frac{V_{oc} - V_{max} - \hat{V}_2(0)e^{-t_d/(\hat{r}_2 \hat{C})}}{[\hat{r}_1 + \hat{r}_2(1 - e^{-t_d/(\hat{r}_2 \hat{C})})]} \quad (34)$$

where: the value of ($t_d$) is the predetermined time duration, and may be for example, between 0.5 sec. and 10 sec., and $V_{max}$ is a maximum operating voltage for the battery, and may be considered a limiting battery voltage.

The minimum current may be defined as:

$$i_{min} = \max(I(t_d, v_{max}), i_{chlim}) \quad (35)$$

The charge power capability may be defined as:

$$P_{cap\_ch}(t_d) = \quad (36)$$
$$\left| i_{min} \right| \left\{ \left( V_{oc} - \hat{V}_2(0)e^{-t_d/(\hat{r}_2 \hat{C})} \right) - i_{min} * \left[ \hat{r}_1 + \hat{r}_2 \left( 1 - e^{-t_d/(\hat{r}_2 \hat{C})} \right) \right] \right\}$$

The time value ($t_d$) can be based on how the battery power capabilities are used by vehicle system controller. The maximum voltage ($v_{max}$) may be determined, for example, by a vehicle manufacturer or a battery manufacturer as the maximum voltage that the battery is allowed to attain.

In addition to determining a charge power capability for a battery, a method for determining a discharge power capability for the battery may also be provided. For determining the discharge power capability, a maximum value of the battery current (I) may be used in conjunction with a minimum value of the battery voltage. The current equation described above can be used to solve for $I_{max}$ as:

$$I(t_d, v_{min}) = \frac{(V_{oc} - V_{min} - \hat{V}_2(0)e^{-t_d/(\hat{r}_2 \hat{C})})}{[\hat{r}_1 + \hat{r}_2(1 - e^{-t_d/(\hat{r}_2 \hat{C})})]} \quad (37)$$

where: $v_{min}$ is a minimum operating voltage of the battery pack.

The maximum current may be defined as:

$$i_{max} = \min(I(t_d, v_{min}), i_{dchhlim}) \quad (38)$$

The discharge power capability may be defined as:

$$P_{cap\_dch} = |i_{max}| \left\{ \left( V_{oc} - \hat{V}_2(0)e^{-\frac{t_d}{\hat{r}_2 \hat{C}}} \right) - i_{max} * \left[ \hat{r}_1 + \hat{r}_2 \left( 1 - e^{-\frac{t_d}{\hat{r}_2 \hat{C}}} \right) \right] \right\} \quad (39)$$

The battery power capability is based on the battery ECM impedance parameters (e.g., $r_1$, $r_2$ and C) that are estimated by the EKF. The battery power capability is further based on the ECM voltage parameter ($V_2$) that is estimated by the model. Note that other calculation methods for the battery power capability may be possible. The above calculation scheme is merely representative of using a battery impedance parameter estimation model to calculate battery power capability. Other battery parameters may be derived from the ECM impedance parameters as well.

The battery and electrical loads may be operated based on the calculated battery power capability. That is, battery current and voltage may be maintained so as not to exceed the battery power capability. Battery power during charging and discharging may be defined as the product of the voltage across the battery terminals and the current flowing through the battery. Electrical loads receiving power from or providing power to the battery may be operated such that the total power of all loads falls within the calculated battery power capability. For example, electric machines may have power limits reduced so that the battery power capability is not exceeded. The controller may manage the electrical loads to maintain the battery power within the computed limits.

The above description thus far describes an example of using an EKF to estimate the states and impedance parameters of a battery ECM. The impedance parameters are a function of the ECM that is chosen. The methods described below are applicable to other battery circuit model formulations as well. For example, the states may be defined differently having more or less states or parameters to estimate. In addition, the battery power capability estimate may be adjusted to correspond to the particular formulation used.

The battery power capability is a useful quantity for effectively controlling the powertrain. The above description is one example of using an Extended Kalman Filter (EKF) to identify battery equivalent circuit model impedance parameters and calculating the related battery power capabilities from the battery impedance parameters. The EKF may require some time to converge to the true parameter values. The convergence time may be a function of the starting values that are used to initialize the EKF. The convergence of the EKF may be influenced by an efficient choice of the initial parameter values.

As the traction battery 124 ages, the capacity, power and energy may decay or decrease. By analyzing battery current and voltage behavior, decayed power capability of the battery can be estimated online by using, for example, the EKF framework based on the battery equivalent circuit model. In the battery ECM, the resistances and capacitance will change with battery age, temperature, and SOC. As such, it may be useful to periodically estimate the parameters to adjust the control strategies.

The ECM impedance parameters ($r_1$, $r_2$, and c) may change over a large range with temperature. For example, for the same SOC and discharge current, battery terminal voltage may be much lower at low temperatures than at room temperature because $r_1$ at low temperature is typically greater than that at room temperature. This results in decrease in the discharge power capability at low temperature when compared with the discharge power capability at room temperature. Correctly adjusting the battery parameters to compensate for this can ensure that the battery is operated within the proper limits.

For the EKF to properly converge, persistent excitation conditions may be defined to achieve an accurate online identification for the ECM parameters and, consequently, an accurate model-based battery power capability estimation. Persistent excitation may be achieved by the battery current being dynamic or sufficiently variable. The current may not be considered to be sufficiently dynamic when the current is generally constant or slowly changing. A generally constant current may be defined as a current that remains within a small range of current values for a time interval greater than a predetermined time. When constant current (including OA current) is flowing through battery, the normal EKF recursion calculation described above may be inhibited or altered since feeding a constant current input into the EKF may drive the online estimation to diverge from the true ECM parameter values. To prevent this condition, when a constant current is detected, updates to the ECM parameters and states may be inhibited.

In some configurations, the BECM 206 may monitor conditions for persistent excitation and only execute the EKF parameter estimation when sufficiently dynamic conditions are present. In general, the parameter estimation may be inhibited during conditions of constant current. During plug-in charging, the charging is often performed at a constant current level. As such, during plug-in charging, conditions for performing the parameter estimation may not normally be present. However, it may be desirable to be able to perform the parameter estimation during plug-in charging.

A charge event may be initiated by coupling the EVSE connector 140 to the charge port 134. The BECM 206 may be programmed to communicate with the EVSE 138 to manage the charging operation. For example, the BECM 206 may generate a charge current request to define the current for charging the traction battery 124. The charge current request may be used by the EVSE 138 and/or power conversion module 132 to control the current flowing to the traction battery 124 to the charge current request. During a charge event, the BECM 206 may monitor the state of the traction battery 124 to determine the charge current request. For example, the BECM 206 may compute and monitor the state of charge of the traction battery 124.

During a normal charge event, the BECM 206 may generate a charge current request that is a generally constant current. For example, the generally constant current may be selected based on a desired charge power level. The normal charge event may include a duration of constant current charging. In some cases, the normal charge event may include a duration of constant voltage charging. For example, as the traction battery 124 state of charge increases, charging voltage limits may be reached. During the constant voltage phase, the battery current may decrease. During the normal charge event, the current is generally constant or slowly varying. As such, the current during the normal charge event may not be sufficiently dynamic for parameter identification.

The BECM 206 may be programmed to identify conditions in which to perform the parameter estimation strategy to identify the parameters of the traction battery 124. The BECM 206 may monitor the time intervals between parameter estimations. This may be monitored by storing a time value corresponding to the most recent successful parameter estimation. A current time value may be compared to the stored time value. If a difference between the current time value and the stored time value (e.g., elapsed time since last parameter estimation) exceeds a predetermined time interval, the BECM 206 may generate a parameter estimation request. The predetermined time interval may be a calibratable value.

In other configurations, the BECM 206 may be programmed to monitor a battery current throughput since the last parameter estimation. The battery throughput may be defined as the time integral of the battery current over a time interval. A battery throughput variable may be initialized to zero upon successful completion of a parameter estimation cycle. At predetermined intervals, the battery current may be sampled and an integral of the battery current may be computed. In some implementations, the product of the battery current and the sampling time interval may be added to the battery throughput variable. The battery throughput variable may be compared to a predetermined battery throughput value. If the battery throughput variable exceeds the predetermined battery throughput value, the BECM 206 may generate a parameter estimation request.

The above strategies for generating the parameter estimation request may take place over one or more ignition cycles. The associated variables may be stored in non-volatile memory to allow the time and/or throughput to accumulate over multiple ignition or power-on cycles. For example, the battery throughput may be accumulated over multiple ignition cycles.

Responsive to the parameter estimation request, the BECM 206 may be programmed to create conditions to achieve persistent excitation for the parameter estimation during the charge event. Disclosed herein is a strategy of achieving persistent excitation for improving convergence and accuracy of the EKF parameter estimation during plug-in charging events. The BECM 206 may cause the charge current request to vary during charging to achieve a sufficiently dynamic current input for the EKF estimation strategy.

Parameters may be defined for the forced excitation strategy. A maximum charging current request (chrg_I_req_Max) may be defined based on characteristics of the charging station, charger, and/or battery cells. The maximum charging current request may define the maximum amount of charge current that can be flowed to the traction battery 124. A minimum charging current request (chrg_I_req_Min) may be defined based on charger limitations. The minimum charging current may define the minimum current that should flow during charging. The maximum charging current request may be greater than the minimum charging current request. The minimum charging current request may be greater than or equal to zero.

A charging current request slew rate (chrg_I_req_slew) may be defined that defines a maximum rate of change of the current request. The charging current request slew rate may be based on utility considerations to avoid potential flickering issues due to sudden large loads being added to the power grid. For example, the charging current request may be allowed to change at a rate of one Amp/second.

A charging current request (chrg_I_req) may be defined that is the requested charge current. The charging current request may be the current requested during the normal charging cycle. The charging current request may be constrained by the maximum charging current request, the minimum charging current request, and the charging current request slew rate. During a normal charge event, the charging current request may be a generally constant current or slowly changing current.

An EKF charging current request (charg_I_req_ekf) may be defined that is the requested charge current for EKF parameter estimation. The EKF charging current request may be constrained by the maximum charging current request, the minimum charging current request, and the charging current request slew rate. The EKF charging current request may be configured to vary the battery current to achieve a persistently exciting input that is sufficient for parameter estimation.

During normal charging operation, the charging current request may be used to define the level of charge current. The charging current request may be configured to minimize the charge time. The charging current request may be at a generally constant level. The normal current request may not cause a sufficiently dynamic current for parameter estimation purposes.

Responsive to a request to identify the parameters, the controller may apply the EKF charging current request during the charge cycle. While the EKF charging current request is applied, the EKF parameter estimation strategy may be performed as detailed above. Once the EKF parameter estimation has converged to a solution, the BECM 206 may apply the normal charging current request. The benefit of this strategy is that the battery parameters can be estimated during the charge cycle within little disruption to the normal charging process. The EKF charging current request may be defined as:

$$\text{chrg\_I\_req\_ekf}(t) = \\ \text{chrg\_I\_req\_min} + \frac{\text{chrg\_I\_req\_max} - \text{chrg\_I\_req\_min}}{2} + \\ \frac{\text{chrg\_I\_req\_max} - \text{chrg\_I\_req\_min}}{2} \\ \sin\left(\frac{\pi * \text{chrg\_I\_req\_slew}}{\text{chrg\_I\_req\_max} - \text{chrg\_I\_req\_min}} t\right)$$

(40)

Figure 5:
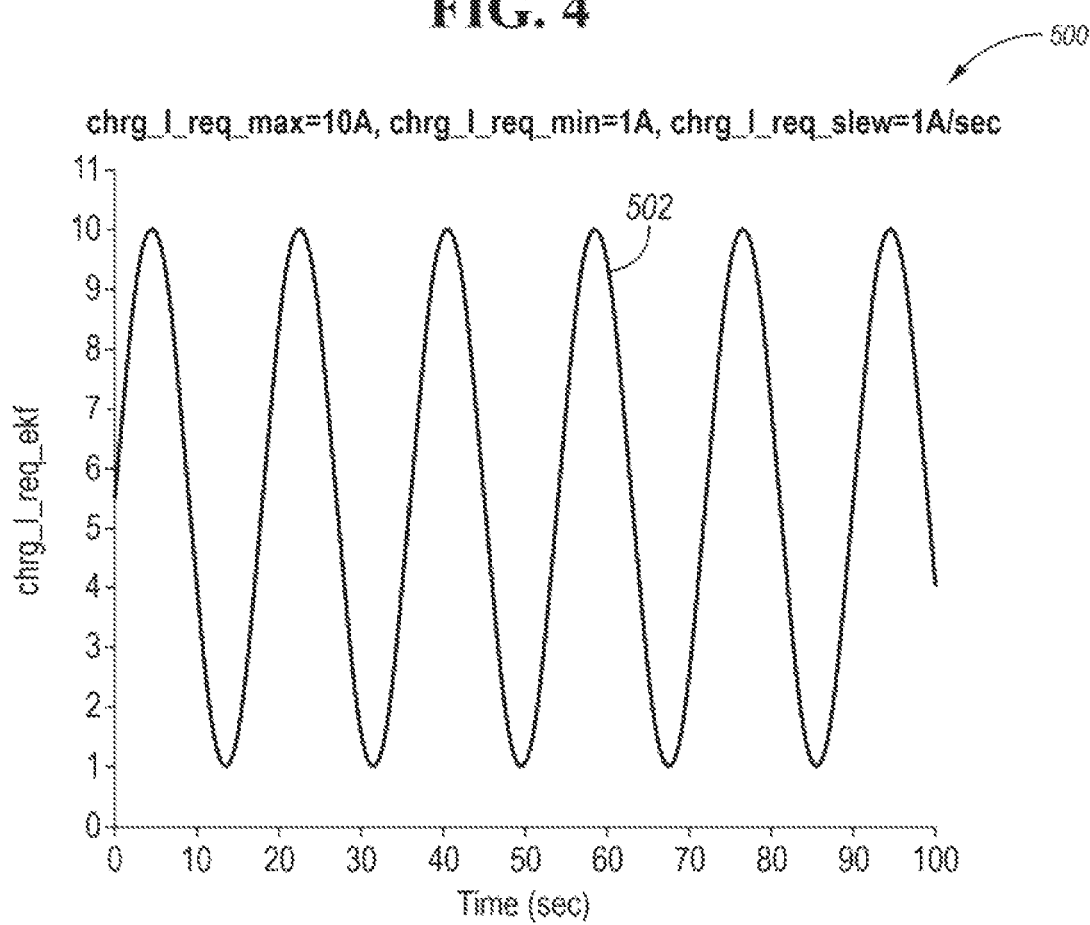
FIG. 5 is a graph showing a possible charge current request for facilitating battery parameter estimation.

FIG. 5 depicts an example graph 500 of the EKF charging current request. The graph 500 depicts an EKF charging current request curve 502 generated by the above equation. In the example, the maximum charge current is set to 10 A, the minimum charge current is set to 1 A, and the slew rate is set to 1 A/sec. The equation defines a sinusoidal charging current request that oscillates between the maximum and minimum charge requests. As defined by the above equation, the EKF charging current request that oscillates about an average of the minimum and maximum charge current values. The EKF charging current request as defined periodically drives the current between the maximum and minimum limits to ensure a dynamic current for parameter estimation. The frequency of the EKF charging current request may depend on the above-defined slew rate parameter. The frequency of the EKF charging current request may be configured such that a rate of change of the current flowing to the battery is prevented from exceeding a predetermined maximum rate of change. As defined by the above equation, the EKF charging current request may be a sinusoidal current that varies sinusoidally between a predetermined maximum current and a predetermined minimum current.

Note that other EKF charging current request definitions are possible. While the above example is generated by an equation, other methods of generating the waveform are possible. For example, a sufficiently dynamic current waveform may be defined by testing or analysis. The waveform may be stored in memory and applied during runtime when the estimation is activated. In other examples, the frequency of the sinusoidal EKF charging current request may be changed over the parameter estimation cycle. In other examples, the amplitude of the sinusoidal EKF charging current request may be changed over the parameter estimation cycle.

Figure 6:
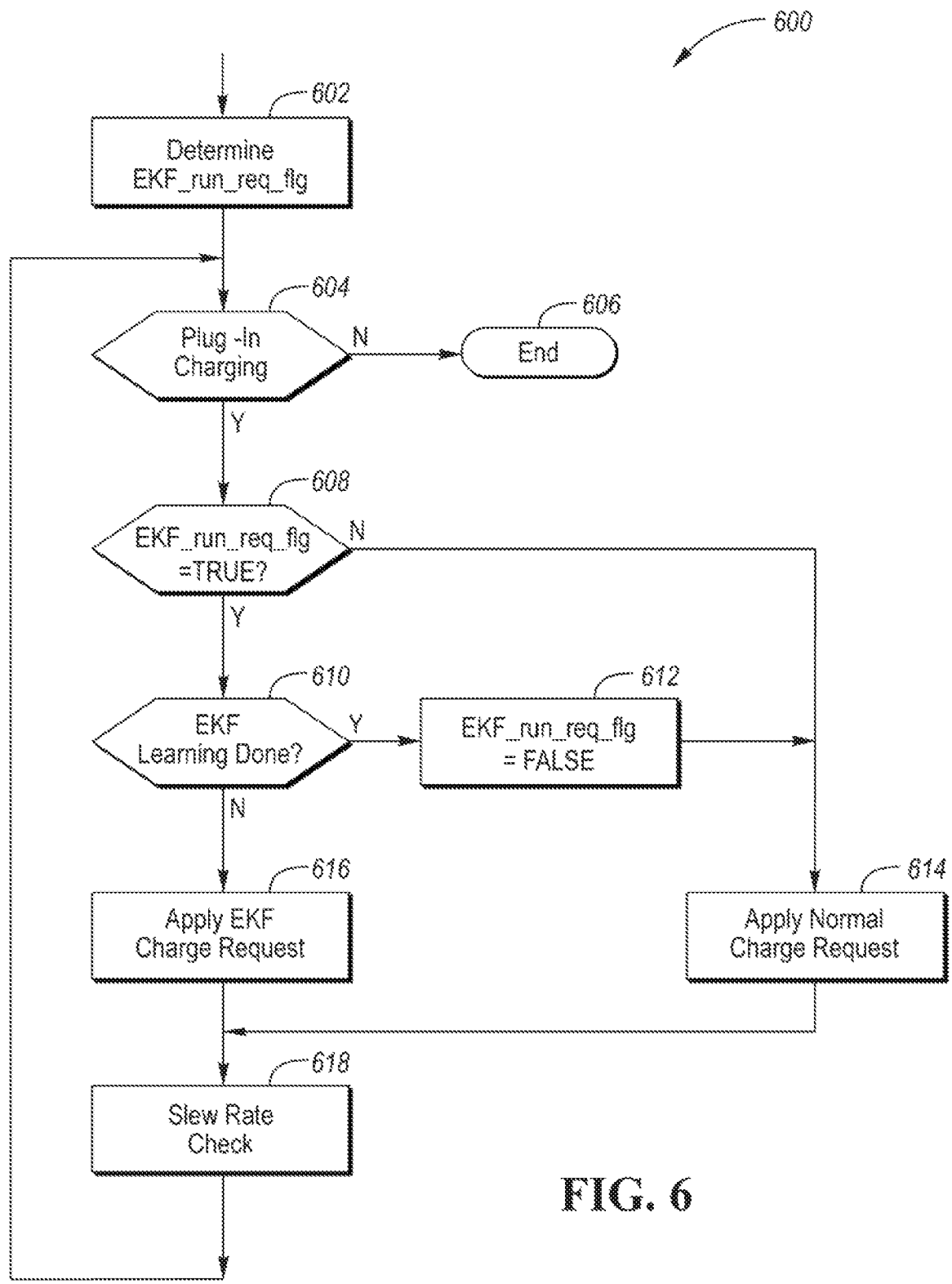
FIG. 6 is a flowchart of a possible sequence of operations for managing a charge current request.

FIG. 6 depicts a flow chart 600 of a possible sequence of operations for implementing the parameter estimation strategy detailed herein. At operation 602, the system may determine if the EKF parameter estimation should be performed. The controller may check conditions such as the amount of time that has elapsed since the last parameter estimation or if the battery throughput has exceeded a predetermined threshold since the last parameter estimation. The controller may update the status of a request parameter estimation flag (EKF_run_req_flg). If the parameter estimation conditions are satisfied, the request parameter estimation flag may be set to TRUE.

At operation 604, a check may be performed to determine if plug-in charging is active or available. For example, the controller may check to see if a charge connector is coupled to the charge port. The controller may check to determine if communication is established with the EVSE 138. If plug-in charging is not active, execution proceeds to operation 606 which ends the procedure. Operations starting at operation 602 may be repeated at a later time. If plug-in charging is active, operation 608 may be performed.

At operation 608, the status of the request parameter estimation flag may be checked. If the request parameter estimation flag is FALSE, no parameter estimation is performed and operation 614 may be performed. At operation 614, the normal charging current request is applied. That is, the battery will be charged using the normal charging current request. The normal charging current request may be a generally constant current.

If the request parameter estimation flag is TRUE, operation 610 may be performed. At operation 610, a check is performed to determine if the EKF parameter estimation is completed. EKF parameter estimation may be completed responsive to a magnitude of the residual or error becoming less than a predetermined error (e.g., a small value near zero). In other case, the EKF may be deemed completed upon expiration of a predetermined amount of time. If the EKF learning is completed, operation 612 may be performed. At operation 612, the request parameter estimation flag may be set to FALSE to return to normal operation. After operation 612, operation 614 may be performed to apply the normal charging current request. The EKF parameter estimation may be performed by a separate control logic running at a different rate than the charge request current determination.

If the EKF parameter estimation is not completed, operation 616 may be performed. At operation 616, the EKF charging current request is applied. The EKF charging current request may be applied as described above and may generate a continuously varying current that provides a persistent excitation for the parameter estimation algorithm. The persistent excitation condition may be a current that causes a residual error of the parameter estimation algorithm to converge toward zero. The parameter estimation algorithm may run in parallel to the charge current determination strategy. At operation 618, the requested charge current may be limited to the slew rate to ensure that any changes in the requested current are within the slew rate limits.

The controller may be programmed to identify values of parameters of the battery via a parameter estimation algorithm as described above. The controller may be programmed to, responsive to an external power supply being coupled to the vehicle and providing a current to the traction battery in a presence of a request to identify the parameters of the traction battery, change the current flowing to the battery from a normal charging current to a predetermined charge current that causes a persistent excitation condition to be satisfied for the parameter estimation strategy. The controller may be further programmed to, responsive to identifying the battery parameters with a predetermined accuracy, change the current to the normal charging current for charging the battery.

A system for charging a battery of a vehicle includes a controller programmed to, responsive to an external power source providing power to the battery during a charge event and in a presence of a request to identify parameters of the battery using a parameter estimation algorithm, change a current flowing to the battery from a generally constant current to a predetermined varying charge current that causes a persistent excitation condition to be satisfied for the parameter estimation algorithm.

The disclosed procedure improves vehicle performance by creating conditions for accurate parameter estimation during charging. As a result, battery parameters and dependent values to be more accurate which allows for improved control and notification of battery-related features. Battery charging is minimally affected since the parameter estimation can typically complete in several minutes. Additionally, the operator is unlikely to notice that the parameter estimation was performed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery; and
a controller programmed to identify values of parameters of the battery via a parameter estimation algorithm and, responsive to an external power supply being coupled to the vehicle and providing a current to the battery in a presence of a request to identify the values of the parameters, change the current flowing to the battery from a normal charging current to a predetermined continuously varying charge current that causes a residual error of the parameter estimation algorithm to converge toward zero, wherein the residual error is defined by a difference between a measure of system output and a prediction of an a priori measurement estimate and wherein the system output represents a difference between a value for an open circuit voltage and a value of a terminal voltage.

2. The vehicle of claim 1, wherein the predetermined continuously varying charge current is a sinusoidal current that varies sinusoidally between a predetermined maximum current and a predetermined minimum current.

3. The vehicle of claim 1, wherein the normal charging current is a generally constant current.

4. The vehicle of claim 1, wherein the controller is further programmed to generate the request to identify the values responsive to an elapsed time since a last parameter estimation exceeding a predetermined duration.

5. The vehicle of claim 1, wherein the controller is further programmed to generate the request to identify the values responsive to a total current of the battery since a last parameter estimation exceeding a predetermined throughput.

6. The vehicle of claim 1, wherein the parameter estimation algorithm is an extended Kalman filter.

7. The vehicle of claim 1, wherein the controller is further programmed to, responsive to the residual error falling below a predetermined threshold, change the current to the normal charging current for charging the battery.

8. The vehicle of claim 1, wherein a frequency of the predetermined continuously varying charge current is configured such that a rate of change of the current is prevented from exceeding a predetermined maximum rate of change.

9. A system for charging a battery of a vehicle comprising:
a controller programmed to, responsive to an external power source providing power to the battery during a charge event and in a presence of a request to identify values of parameters of the battery using a parameter estimation algorithm, change a current flowing to the battery from a generally constant current to a predetermined continuously varying charge current that causes a residual error of the parameter estimation algorithm to converge toward zero, wherein the residual error is defined by a difference between a measure of system output and a prediction of an a priori measurement estimate and wherein the system output represents a difference between a value for an open circuit voltage and a value of a terminal voltage.

10. The system of claim 9, wherein the controller is further programmed to generate the request to identify the values responsive to an elapsed time since a last parameter estimation exceeding a predetermined duration.

11. The system of claim 9, wherein the controller is further programmed to generate the request to identify the values responsive to a total current of the battery since a last parameter estimation exceeding a predetermined throughput.

12. The system of claim 9, wherein the controller is further programmed to, responsive to identifying the values with a predetermined accuracy, change the current back to the generally constant current for charging the battery.

13. The system of claim 9, wherein the predetermined continuously varying charge current is a sinusoidal current that varies sinusoidally between a predetermined maximum current and a predetermined minimum current.

14. The system of claim 9, wherein the predetermined continuously varying charge current is configured to limit a rate of change of the current to a predetermined maximum rate of change.

15. The system of claim 9, wherein the parameter estimation algorithm is an extended Kalman filter.

16. A method comprising:
by a controller,
identifying values of parameters of a battery of a vehicle using a parameter estimation algorithm responsive to a request to identify the values;
causing a current for charging a battery to be a generally constant current responsive to a charge event when an external power source is coupled to the vehicle; and
changing the current to be a predetermined continuously varying current that causes a residual error of the parameter estimation algorithm to converge toward zero responsive to receiving the request to identify parameters of the battery during the charge event, wherein the residual error is defined by a difference between a measure of system output and a prediction of an a priori measurement estimate and wherein the system output represents a difference between a value for an open circuit voltage and a value of a terminal voltage.

17. The method of claim 16 further comprising, responsive to the residual error falling below a threshold, causing the current to be to the generally constant current.

18. The method of claim 16 wherein the predetermined continuously varying current is a sinusoidal current that varies sinusoidally between a predetermined maximum current and a predetermined minimum current.

* * * * *